2,861,758

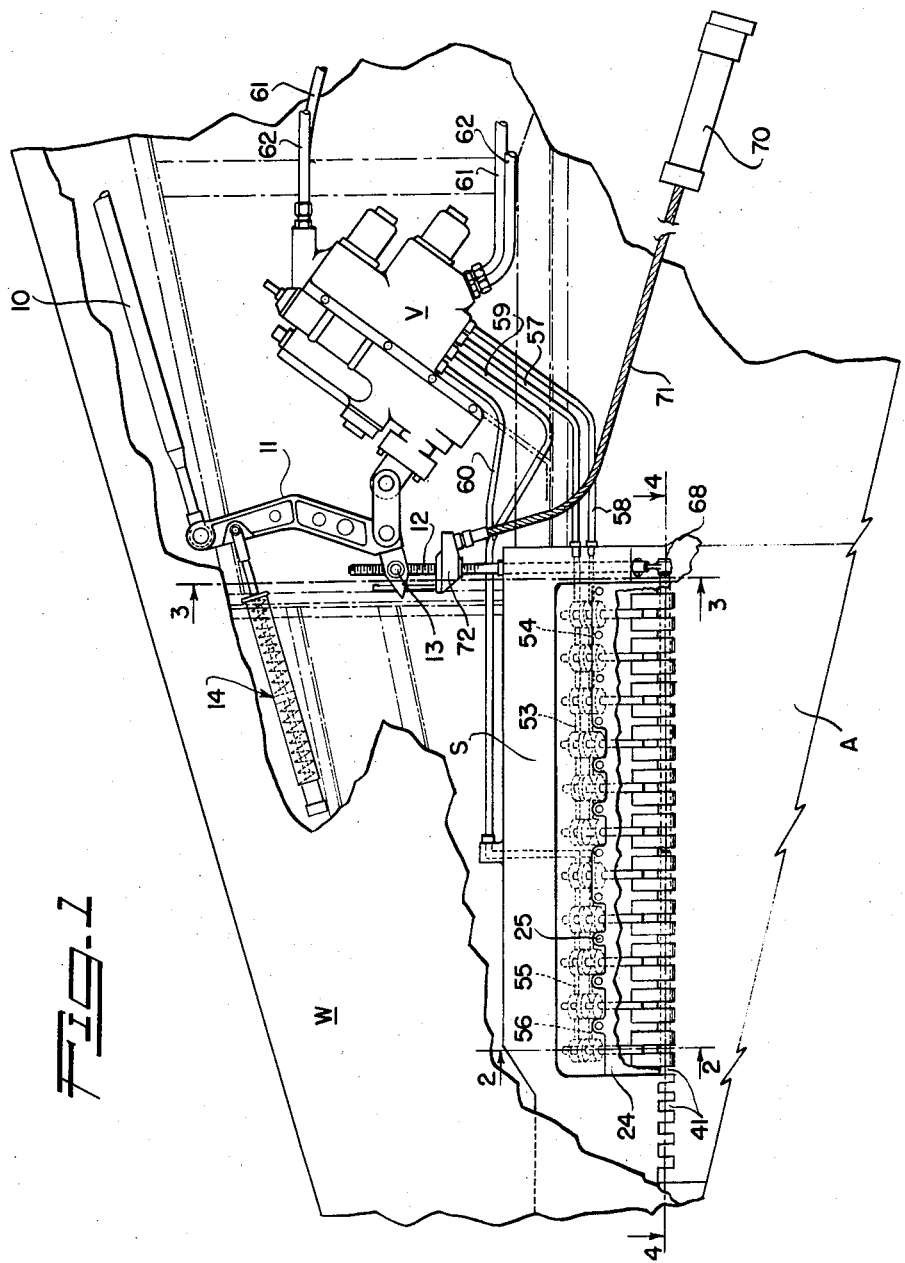

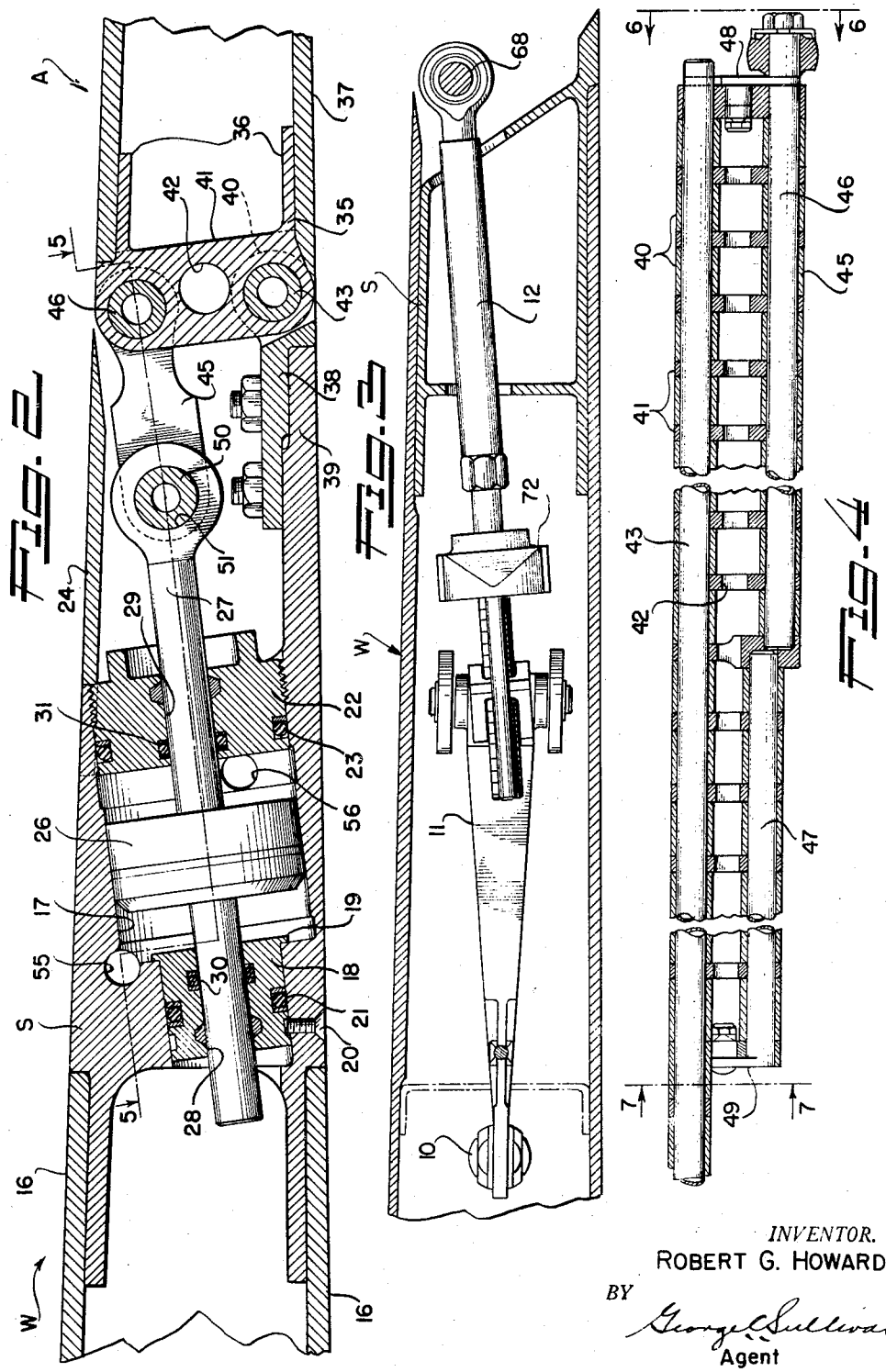

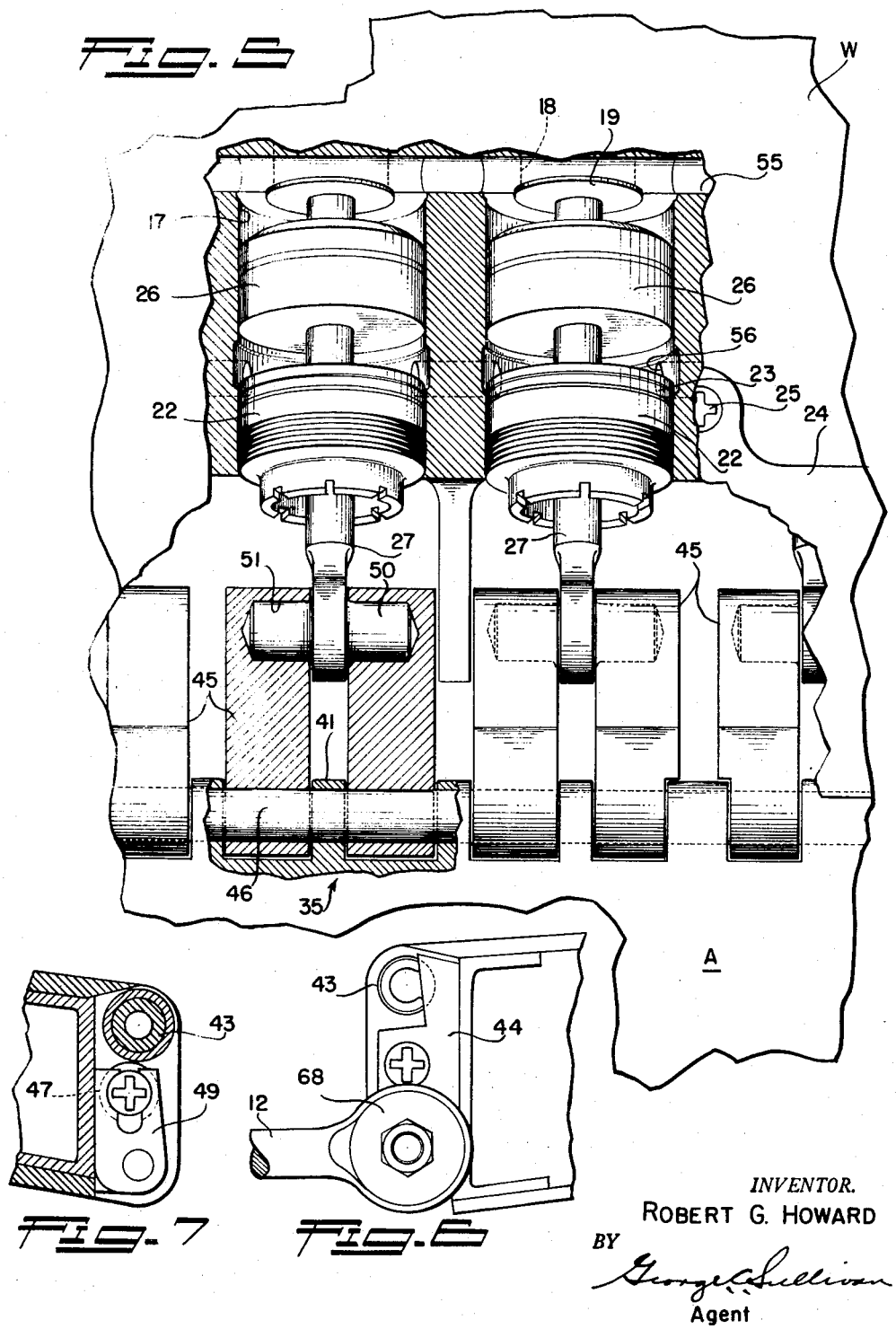

CONTROL SURFACE ACTUATORS

Robert G. Howard, Northridge, Calif., assignor to Lockheed Aircraft Corporation, Burbank, Calif.

Application August 2, 1954, Serial No. 447,000

7 Claims. (Cl. 244—90)

This invention is concerned with the actuation of aerodynamic control surfaces and relates particularly to actuators for operating or moving ailerons and the like.

Present day high velocity aircraft are designed with extremely thin airfoils. These thin airfoils do not afford sufficient internal space to accommodate the usual aileron actuators which include bellcranks or similar lever arrangements. As it is extremely undesirable from the standpoint of increased aerodynamic drag to have any portions of the actuating mechanisms protrude beyond the contour or surface of the wing, the provision of appropriate aileron actuators, and the like, has constituted an extremely difficult problem. Another problem encountered in such situations is the provision of an adequately rigid and strong attachment of the aileron unit or assembly to the wing.

A general object of this invention is to provide a practical, effective actuating means for ailerons, and the like, particularly well suited for use in thin airfoils.

Another object of the invention is to provide actuating means of this character that requires a minimum of space in the vertical direction and, therefore, is adapted to be housed entirely within the contour of thin and extremely thin airfoils.

Another object of the invention is to provide actuating means of this kind that substantially uniformly distributes the actuating forces along either the entire length of the aileron hinge region or a major portion thereof and that constitutes or embodies a very stiff, strong and reliable hinge attachment of the aileron to the wing.

It is another object of the invention to provide a surface actuator of the class referred to in which the hinge moment for effecting actuation or control of the aileron, or the like, is considerably greater than obtainable with the customary or conventional actuators.

It is another object of the invention to provide actuating means of this kind that is directly or integrally incorporated in the spar of the airfoil or wing to thereby reduce the space requirements and to obtain maximum strength and stiffness coupled with a large hinge moment.

It is a further object of the invention to provide an actuating means embodying a unique cylinder block integral with the wing spar and having a multiplicity of cylinders arranged in a spanwise row with pistons operable in the cylinders and linked directly with the aileron, or the like. This multiple cylinder and piston mechanism incorporated in the spar itself and having its pistons linked directly to the aileron is compact, permits of a stiff aileron mounting, distributes the aileron actuating forces and permits of a maximum hinge moment for actuation of the aileron, or the like.

A still further object of the invention is to provide an actuator means of this character that may be associated with a dual servo valve, input crank and a follow-up-trim-rod in such a manner that lateral trim may be readily effected with a minimum of drag.

Another and important object of the invention is to provide an actuator of the character described that avoids the necessity for employing counterweights or counterbalancing means for the aileron or control surface.

Other objectives and features of the invention will become apparent from the following detailed description of a typical preferred embodiment thereof throughout which description reference will be made to the accompanying drawings wherein:

Figure 1 is a plan view of an airfoil incorporating the features of the invention, upper skin parts of the airfoil being broken away to show the actuator, servo valve, fluid pressure lines, the pilot's push-pull rod, etc. in elevation;

Figure 2 is an enlarged fragmentary vertical detailed sectional view through the cylinder block means of the invention illustrating one piston in elevation, being a view taken in substantially as indicated by line 2—2 on Figure 1;

Figure 3 is an enlarged vertical detailed sectional view taken substantially as indicated by line 3—3 on Figure 1;

Figure 4 is an enlarged fragmentary vertical sectional view taken substantially as indicated by line 4—4 on Figure 1, illustrating the piston link mounts and hinge means of the multiple cylinder arrangements;

Figure 5 is an enlarged fragmentary sectional view taken substantially as indicated by line 5—5 on Figure 2, illustrating two adjacent pistons in elevation;

Figure 6 is a fragmentary end view taken substantially as indicated by line 6—6 on Figure 4; and Figure 7 is a fragmentary vertical sectional view taken substantially as indicated by line 7—7 on Figure 4.

The actuator of the invention may, of course, be employed to control or operate various aerodynamic control surfaces, may be used in airplanes of different types and designs, and may be used with servo valve devices, pilot controls, etc. as selected or required. In the drawings I have shown an actuator of the invention associated with the spar of a thin aircraft wing W to actuate an aileron A, the actuator being controlled by a servo valve mechanism V. The valve mechanism V is in turn operated by a pilot operated rod 10 through the medium of a crank 11. The crank 11 is pivoted on a threaded follow-up rod 12 at 13 and an artificial "feel" cylinder and spring unit 14 is connected with the crank 11 to provide the pilot with a suitable sense of feel. The actuating fluid pressure lines between the valve mechanism V and the actuator and the manner in which the rod 12 is connected with the actuator and is operated will be more fully described below. The valve mechanism V, the crank 11, the feel unit 14 and related parts are shown in the drawings in only a general way as the invention is not limited to use in conjunction with these particular instrumentalities.

As above mentioned, the actuating means of the invention is preferably associated with a spar S of the wing W. This is the rear spar of the wing W and is best illustrated in Figure 2 of the drawings. The spar S is constructed so that upper and lower skins 16 of the wing W may be readily secured thereto to be flush with upper and lower surfaces of the spar, these surfaces of the spar thus constituting external surfaces of the wing. The spar S, or at least a portion thereof, forms the cylinder block of the multi-cylinder actuator. As shown in Figures 1, 2 and 5, there is a row or plurality of spaced cylinders 17 in the spar S. The cylinders 17 may be bores formed or machined directly in the spar S and the several cylinders are preferably parallel and of equal diameter and effective length. The cylinders 17 slope upwardly and rearwardly with respect to the medial spanwise plane of the wing and spar. The inner or forward ends of the cylinders 17 are counterbored to receive bushings or blocks 18. These blocks 18 are held against displacement by flanges 19 bearing on the bottom or forward walls of the cylinders 17 and by screws 20. Appropriate seals 21 are provided to prevent fluid pressure leakage around the blocks 18. Cylinder head blocks 22 are screw-threaded in the outer or rear ends of the cylinders 17 and suitable seals 23 serve to prevent the leakage of fluid from around these blocks. It will be observed from an inspection of Figures 1 and 2 that the upper wall of the spar S is cut away in the region of the cylinders 17 to give access to the cylinders and to permit the assembling of parts in the cylinders, this open portion of the spar normally being closed by a plate 24 removably secured to the spar by screws 25, or the like.

A piston 26 operates in each cylinder 17 and is provided with a rod 27 for connection with the aileron A. The rods 27 are slidably guided in central openings 28 in the forward cylinder bushings or blocks 18 and slidably pass through central openings 29 in the aft blocks 22. Suitable seal means 30 and 31 are provided in the blocks 18 and 22 respectively to seal about the piston rods 27. The outer or aft ends of the piston rods 27 are enlarged and have transverse openings 51 for receiving a tubular hinge pin or crank pin 50 to be more fully described below. From the foregoing it will be seen that the actuator includes two or more spaced cylinders 17 in the wing spar S carrying aileron actuating pistons 26.

In accordance with the invention the aileron A is preferably hinged to the aft edge of the spar S. The aileron A, as illustrated, includes a forward beam member 35 having upper and lower rearwardly protruding flanges 36 to which the aileron skin sheets 37 are secured. A hinge member 38 is secured to a lower aft flange 39 of the wing spar S and has a series of spaced hinge lobes 40. These lobes 40 are received between spaced parts or webs 41 of the aileron beam member 35. The hinge lobes or webs 41 of the member 35 extend between and connect the spaced flanges 36, mentioned above, and may have lightening holes 42. A tubular hinge pin 43 is received in transverse openings in the intermeshing sets of lobes 40 and webs 41 to hingedly mount the aileron A on the wing W. The hinge shaft or pin 43 is held against axial displacement by a retaining plate 44 attached to an end of the aileron member 45 by screws, or the like, and cooperating with a notched end of the pin, see Figure 6. From the foregoing it will be seen that the aileron A is mounted on the aft edge of the wing W by a strong, rigid and dependable piano type hinge arrangement.

It is a feature of the invention that the actuator pistons 26 are directly operatively linked with the aileron A. The operative connections between the pistons 26 and the aileron A include links 45 having their aft end portions received between the abovementioned spaced webs 41 of the aileron beam member 35. A tubular pivot pin or shaft 46 passes through aligned horizontal openings in the webs 41 and links 45 to pivotally connect the links with the aileron A. Where the configuration of the aileron permits and where only a limited number of cylinders 17 are required, a single pivot shaft 46 may serve to connect the several links 45 with the aileron. However, where the aileron A has a substantial taper or is relatively narrow or where its construction does not permit the employment of a single long pivot shaft, two similar but slightly offset pins or shafts 46 and 47 may be employed, as illustrated in Figure 4. The outboard shaft 47 is offset slightly in the vertical direction from the inboard shaft 46. The links 45 cooperating with the outboard shaft 47 and their pistons 26 may be identical with the links and pistons associated with the inboard shaft 46 but the cylinders 17 of the outboard assemblies are displaced forwardly to accommodate the offsetting of the shaft 47 and the strokes of the related pistons are somewhat shorter. The inner opposing ends of the shafts 46 and 47 may abut or engage and retaining plates 48 and 49 are secured to the ends of the aileron beam member 35 to cooperate with the other ends of the respective shafts 46 and 47 to prevent displacement of the shafts and to prevent rotation of the shafts. Upon inspection of Figure 2 it will be seen that the links 45 are operatively connected with the aileron A on an axis immediately adjacent the upper contours of the wing W and aileron A while the axis of the hinge pin 43 is adjacent the lower contours of the wing and aileron. Thus the active hinge moment is large. Also, it should be observed that the links 45 are pivotally connected with substantially uniformly spaced parts of the rigid beam member 35 of the aileron A to assure a strong, rigid operative connection between the actuating piston mechanism and the aileron.

The connections between the inner or forward ends of the links 45 and the pistons 26 include trunnions or pins 50 on the outer or aft ends of the piston rods 27. The pins 50 project horizontally or transversely from opposite sides of the piston rods 27 and may be integral with the rods. The forward end portions of the links 45 have transverse openings or sockets 51 turnably or rotatably receiving the pins 50. This is clearly shown in Figure 5 where it will be seen that each piston rod 27 is operatively connected with the aileron A by two links 45 cooperating with its pins 50 and the pivot shaft 46 or 47.

The cylinder block region of the wing spar S is ported to conduct the actuating fluid under pressure to and from the opposite ends of the cylinders 17. If desired, a single port system may serve the several cylinders 17. However, I prefer to employ one port and line system for a number of the inboard cylinders 17, say six of the inboard cylinders, and a second port and pipe system for the remaining cylinders. The first named system includes a port 53 extending longitudinally or spanwise through the spar S from its inboard end to partially intersect and communicate with the inner or forward ends of the selected number of cylinders 17 and a similar port 54 extending from the inboard end of the spar S to intersect the same inboard cylinders 17 adjacent their outer blocks or bushings 22. The second named port system includes ports 55 and 56, corresponding with the ports 53 and 54 respectively entering the forward side of the spar S and then extending outboard through the spar to respectively intersect the forward and aft ends of the remaining cylinders 17.

As previously pointed out, the actuator of the invention may be controlled in any selected manner by appropriate valves, pilot actuated controls, etc. In Figure 1 of the drawings I have shown fluid pressure lines or hydraulic lines 57, 58, 59 and 60, extending from the servo valve V to the ports 53, 54, 55 and 56 respectively of the actuator. The valve V is, of course, provided with fluid pressure supply and return lines 61 and 62. The valve V is shown housed or mounted within the wing W adjacent the inboard end of the aileron actuator. The abovementioned lever or crank 11 operatively connects the pilot input push rod 10 with the valve V and trim rod or screw 12. The rod or screw 12 has its aft end connected with the pivot shaft 43 as shown at 63 in Figures 1 and 6. Upon the pilot causing movement of the rod 10 the valve V is opened as a consequence of the resultant "error" between the pilot's rod 10 and the previous position of the aileron and the rod 12 connected therewith. When the valve V is opened hydraulic pressure is admitted to the cylinders 17 to move the pistons 26 in a direction to cancel the "error" through the action of the follow-up trim rod 12. In other words, the movement of the aileron A produced by actuation of the pistons 26 causes the rod 12 to move the valve lever in a direction to shut off the fluid pressure being supplied to the cylinders 17. In the particular arrangement illustrated inboard movement of the pilot actuated rod 10 results in raising of the aileron A while outboard movement of the rod 10 causes the aileron to move downwardly. It should be noted that the multiple hydraulic cylinder and piston actuator directly operatively coupled with the aileron A avoids the necessity for counterweights, or the like.

I have shown an aileron trim actuator 70 having a flexible shaft means 71 driving a jack or nut device 72 on the rod 12. The electric trim actuator 70 may be controlled by a suitable switch, not shown, in the cockpit. In a typical airplane there will be an aileron A on each wing W and when the pilot actuates a switch in the cockpit the actuator 70 in one wing causes the associated rod 12 to "lengthen" while the actuator 70 in the other wing operates to "shorten" its associated follow-up trim rod 12. This lengthening and shortening of the rod 12 actuates the valve V to cause the actuator of the invention to move or trim the aileron A. Such trimming of the ailerons A will not change the position of the control stick associated with the rods 10. While I have described the operation of the crank 11, valve V, rod 12, actuator 70, as associated with the aileron actuator means of the invention, it is to be understood that the invention is not to be considered as restricted for use with these particular controls or associated instrumentalities.

Having described only typical forms of the invention I do not wish to be limited to the specific details herein set forth, but wish to reserve to myself any variations or modifications that may appear to those skilled in the art and fall within the scope of the following claims.

I claim:

1. In combination with an airfoil and a control surface; a continuous spar extending spanwise along the trailing edge of the airfoil having a plurality of spanwise-spaced fore and aft cylinder openings therein and having upper and lower walls extending spanwise of the airfoil substantially coincident with the upper and lower contours of the airfoil, hinge means securing the lower forward margin of the control surface on said lower wall of the spar for angular movement about a spanwise axis, pistons operable in said openings, and means operatively connecting the pistons with the upper forward marginal region of said surface whereby the pistons are operable to move said surface about said axis.

2. In combination with an airfoil and a control surface; a structural spar extending spanwise along the trailing edge of the airfoil having a plurality of spanwise-spaced fore and aft cylinder openings therein and having upper and lower walls substantially coincident with the upper and lower contours of the airfoil, hinge means securing the lower forward margin of the control surface on said lower wall of the spar for angular movement about a spanwise axis, pistons operable in said openings, links connected with the pistons, and a pivot shaft on the upper forward margin of the control surface connecting said links with the surface.

3. In combination with an airfoil and a control surface; a continuous structural spar member extending spanwise along the trailing edge of the airfoil having a plurality of spanwise-spaced fore and aft cylinder openings therein and having upper and lower walls substantially coincident with the upper and lower contours of the airfoil, a beam extending along the forward edge of the control surface, series of intermeshing lobes on said lower wall and the lower portion of said beam, a hinge pin cooperating with said lobes to mount the control surface for angular movement on a spanwise axis adjacent the lower contour of the airfoil, pistons operable in said cylinder openings, and having rods extending aft therefrom, links on the rods, and a pivot shaft connecting the links with the upper portion of said beam.

4. In combination with a control surface; an airfoil characterized by a structural spar extending along the trailing edge of the airfoil having a plurality of spanwise-spaced fore and aft cylinder openings therein and having upper and lower spanwise extending walls substantially coincident with the upper and lower contours of the airfoil, hinge means securing the lower forward margin of the control surface on said lower wall of the spar for angular movement about a spanwise axis, pistons operable in said openings, the spar having a fluid pressure port communicating with the forward ends of the cylinder openings and a fluid pressure port communicating with the aft ends of the cylinder openings, and means operatively connecting the pistons with the upper forward marginal region of said surface whereby the pistons are operable to move said surface about said axis.

5. In combination with an airfoil and a control surface; a spar member extending along the trailing edge of the airfoil and having upper and lower portions substantially flush with the upper and lower surfaces of the airfoil and having a row of cylinder openings provided therein, the openings extending fore and aft and sloped upwardly and rearwardly, hinge means mounting the forward lower edge of the control surface on said lower portion of the member for movement about a spanwise axis, pistons operable in the cylinder openings, rods on the pistons extending aft from said openings, links on the rods, and a pivot shaft connecting the aft ends of said rods with the upper forward edge of the control surface.

6. In a wing of the character described, an aft wing spar having upper and lower surfaces extending spanwise of the wing and exposed to constitute upper and lower wing surfaces, skins attached to the spar and extending forwardly therefrom to present surfaces which form extensions of said wing surfaces, an aileron, a hinge mounting the aileron on the lower aft edge of the spar, the spar having a cylinder opening provided therein, a piston operable in the opening and having a rod extending aft therefrom, a link on the rod, and a pivotal connection between the link and the upper forward corner of the aileron.

7. In a wing of the character described, an aft wing spar having upper and lower surfaces extending spanwise of the wing and exposed to constitute upper and lower wing surfaces, skins attached to the spar and extending forwardly therefrom to present surfaces which form extensions of said wing surfaces, an aileron, a hinge mounting the aileron on the lower aft edge of the spar, the spar having a cylinder opening therein, a piston operable in the opening and having a rod extending aft therefrom, the spar having actuating fluid pressure ports communicating with the ends of the cylinder opening, a link on the rod, and a pivotal connection between the link and the upper forward corner of the aileron.

References Cited in the file of this patent

UNITED STATES PATENTS

| | | |
|---|---|---|
| 2,619,304 | Feeney et al. | Nov. 25, 1952 |
| 2,665,555 | Martinsson | Jan. 12, 1954 |
| 2,699,649 | Messick | Jan. 28, 1955 |
| 2,753,134 | Gordon et al. | July 3, 1956 |

FOREIGN PATENTS

| | | |
|---|---|---|
| 782,527 | France | Mar. 18, 1935 |